(12) United States Patent
Durand de Gevigney et al.

(10) Patent No.: US 12,163,899 B2
(45) Date of Patent: Dec. 10, 2024

(54) SYSTEM FOR OPTICAL INSPECTION OF A SUBSTRATE USING SAME OR DIFFERENT WAVELENGTHS

(71) Applicant: Unity Semiconductor, Montbonnot-Saint-Martin (FR)

(72) Inventors: Mayeul Durand de Gevigney, Montbonnot-Saint-Martin (FR); Guillaume Vienne, Corenc (FR); Kaiss Benhadjsalem, Sassenage (FR)

(73) Assignee: Unity Semiconductor, Montbonnot-Saint-Martin (FR)

( * ) Notice: Subject to any disclaimer, the term of this patent is extended or adjusted under 35 U.S.C. 154(b) by 0 days.

(21) Appl. No.: 18/341,339

(22) Filed: Jun. 26, 2023

(65) Prior Publication Data

US 2024/0068956 A1 Feb. 29, 2024

(30) Foreign Application Priority Data

Aug. 31, 2022 (EP) .................................. 22315203

(51) Int. Cl.
*G01N 21/95* (2006.01)
*G01N 21/88* (2006.01)
(52) U.S. Cl.
CPC ..... *G01N 21/9501* (2013.01); *G01N 21/8806* (2013.01); *G01N 2021/8845* (2013.01); *G01N 2201/0846* (2013.01)
(58) Field of Classification Search
CPC .......... G01N 21/9501; G01N 21/8806; G01N 2021/8845; G01N 2201/0846

USPC ...................... 356/237.1–237.6, 239.1–239.8
See application file for complete search history.

(56) References Cited

U.S. PATENT DOCUMENTS

| 7,304,310 B1* | 12/2007 | Shortt .................... G01N 21/94 |
| | | 250/372 |
| 10,209,190 B2 | 2/2019 | Kiss et al. |
| 2008/0005909 A1 | 1/2008 | Hsieh |
| 2008/0059094 A1* | 3/2008 | Shimura ............ G01N 21/9501 |
| | | 702/81 |
| 2009/0213364 A1* | 8/2009 | Matsui ............... G01N 21/8806 |
| | | 356/237.3 |
| 2012/0127467 A1 | 5/2012 | Ivanov et al. |
| 2012/0262566 A1 | 10/2012 | Grzegorczyk et al. |
| 2014/0146297 A1 | 5/2014 | Vainer et al. |
| 2015/0260652 A1 | 9/2015 | Verstegen et al. |
| 2021/0318243 A1* | 10/2021 | Wollmann ......... G01N 21/8903 |

FOREIGN PATENT DOCUMENTS

| JP | 5850447 B1 | 2/2016 |
| WO | 2021/249698 A1 | 12/2021 |

OTHER PUBLICATIONS

European Office Action for Application No. 22315203.4 dated Sep. 7, 2023, 4 pages.

(Continued)

*Primary Examiner* — Tri T Ton
(74) *Attorney, Agent, or Firm* — TraskBritt (57) ABSTRACT

A system for optical inspection of a substrate. The system comprises an illumination device defining an inspection area on the substrate, a support to receive the substrate, and a detection device defining a detection area on the substrate. The inspection area is positioned ahead, with respect to the scanning direction, of at least a portion of the detection area.

20 Claims, 10 Drawing Sheets

(56) References Cited

OTHER PUBLICATIONS

International Search Report for Application No. PCT/EP2023/066844 dated Aug. 17, 2023, 4 pages.
International Written Opinion for Application No. PCT/EP2023/066844 dated Aug. 17, 2023, 6 pages.
European Search Report for U.S. Appl. No. 22/315,203 dated Jan. 27, 2023, 7 pages.

* cited by examiner

SYSTEM FOR OPTICAL INSPECTION OF A SUBSTRATE USING SAME OR DIFFERENT WAVELENGTHS

PRIORITY CLAIM

This application claims the benefit of the filing date of European Patent Application Serial No. EP22315203.4, filed Aug. 31, 2022, for "A SYSTEM FOR OPTICAL INSPECTION OF A SUBSTRATE USING SAME OR DIFFERENT WAVELENGTHS," the disclosure of which is hereby incorporated herein in its entirety by this reference.

TECHNICAL FIELD

The present disclosure relates to a system for optical inspection of a substrate, for instance, a substrate presenting photoluminescence properties, to detect the possible presence of defects, such as particles or crystalline defects, or more generally to characterize the surface and subsurface condition of the substrate. The substrate can be a wafer made of a monocrystalline material for the manufacture of devices, for instance, in the field of microelectronics, optics, microsystems, or optoelectronics.

BACKGROUND

Substrates, such as crystalline wafers for electronics, optics or optoelectronics applications, need to be inspected to detect, identify and/or characterize possible defects present on their surface or just below their surface. Defects can be particles, crystal defects, scratches or surface roughness.

This inspection is generally intended to provide qualitative or quantitative information, such as, for example, the location, size and/or nature of the defects. This information about the surface and subsurface condition of the substrate may be representative of the quality of the substrate manufacturing process or of a production step in which the substrate is used. US20080059094A1 discloses a defect inspection apparatus that can provide such type of information.

Some substrates may exhibit photoluminescence properties, that can be intrinsic to the material or that can be due to doping or crystalline defects present in the thickness of the substrate. As this is well known, photoluminescence is manifested by certain materials, which, subjected to a radiation, emit, in all the directions, a radiation of different wavelength. Examples of materials showing such behavior are compound semiconductors, such as indium phosphide, gallium arsenide, silicon carbide, that find applications in the semiconductor industry, for instance, for electric vehicles or other power-related applications, thanks to their ability to handle higher power and/or higher frequencies than classic silicon-based electronics.

The photoluminescent behavior can be advantageously exploited to characterize these materials. In that case, the materials are illuminated by a light beam presenting a wavelength short enough so that the energy is greater than the bandgap energy of the material, and the resulting photoluminescence radiation is detected in various wavelengths, for instance, in the near UV, visible or infrared areas. To better characterize and classify defects or intrinsic properties of materials, the photoluminescence can also be used in combination with known measurements techniques using reflection or scattering of the light beam at the illumination wavelength, as this is presented, for instance, in U.S. Pat. No. 7,304,310B1.

It is also known to use inelastic scattering methods to characterize substrates or materials. In that case, some scattered photons undergo a change of wavelength during the interaction with the material. Examples of inelastic scattering comprise Raman scattering and Brillouin scattering. By contrast, elastic scattering concerns the light scattered at excitation wavelength.

In some applications, the photoluminescent radiation or the inelastic scattering can be considered as a nuisance, adding an unwanted noise to the scattering measurements.

The document JP5850447B1 describes a confocal inspection system for characterizing a substrate made of SiC material. The inspection system uses an incident light beam presenting a wavelength between 313 nm and 365 nm to generate photoluminescence within the SiC material of the substrate. Several confocal detectors are combined with optical filters to detect selectively the light scattered by the substrate at the excitation wavelength, the band edge photoluminescent emission of the crystal material at 380 nm, and photoluminescent emissions in the visible and NIR ranges due to defects. The confocal inspection system enables spatial filtering of the photoluminescent emissions to only provide to the detectors those emissions produced on the surface or immediate subsurface of the substrate.

In the semiconductor industry, the throughput or number of wafers that can be analyzed per unit of time is essential. However, the photoluminescence phenomenon is intrinsically slow because of the time periods between absorption and photonic emission of the material and because of the decay time of the induced luminescence, which can last up to a few microseconds, in the applications of interest related to defect characterization.

The inspection systems of the prior art must be operated at slower speed than for scattering detection, for instance, to collect enough photoluminescent radiation.

BRIEF SUMMARY

A purpose of the present disclosure is to resolve, at least partially, the aforementioned problem and to propose a system for optical inspection of a substrate, in particular, a substrate made of compound materials, the substrate presenting photoluminescence properties and/or inelastic scattering properties. Another purpose of the present disclosure is to provide an inspection system able to measure efficiently and discriminate between radiation issued respectively from elastic scattering, inelastic scattering and/or photoluminescence. Another purpose of the present disclosure is to provide an inspection system able to measure at least one of elastic scattering, for instance, in a dark-field configuration mode, inelastic scattering and photoluminescence radiation, with these measurements not being affected or perturbated by the others. Another purpose of the present disclosure is to provide an inspection system capable of measuring photoluminescent radiation with high sensitivity, high resolution and high speed. Another purpose of the present disclosure is to provide an inspection system capable of providing information about substrates and their defects allowing the identification and a classification of these defects.

To this effect, the present disclosure relates to a system for optical inspection of a substrate. The system includes an illumination device comprising a light source for generating at least one incident light beam presenting at least a first wavelength directed onto an exposed surface of the substrate to define onto an inspection area of the substrate, defects present on, or close to, the surface of the substrate provoking an emission of radiation at a first wavelength and/or radiation presenting at least a second wavelength different from the at least first wavelength. The system further includes a support to receive the substrate and to position the substrate relatively to the illumination device, the support and the light source being movable relatively to each other according to a scanning direction. The system further includes a detection device comprising a collector for collecting at least a portion of the radiation at the first wavelength and/or at the second wavelength originating from a detection area of the substrate and a detector optically associated to the collector. The detector presents a sensing surface for capturing the collected radiation. The detection area corresponds to an optical conjugate of the sensing surface by the collector, the detection device providing a measurement signal representing a variation in intensity of the collected radiation as the substrate is moved along the scanning direction. The system is configured to position the inspection area ahead of at least a portion of the detection area, with respect to the scanning direction, while the inspection area scans the exposed surface of the substrate, such that a part of the substrate having left the inspection area due to a relative movement of the support and the light source will still be in the detection area for some time.

The residence time of a defect in the detection area of a system according to the present disclosure is greater than, and/or delayed with respect to, the residence time of the defect in the inspection area as the substrate is moved under the illumination beam. The velocity at which the incident light is scanned over the exposed surface of the substrate may be increased without loss of collection of the photoluminescence signal and/or or in the case of any inelastic scattering effect, and the inspection system throughput is improved.

According to further non limiting features of this aspect of the present disclosure, either taken alone or in any technically feasible combination:

the illumination device comprises a splitter to form two incident light beams converging and crossing each other on the substrate to define the inspection area;
the illumination device is configured so that the incident light beams cross each other at the surface of the substrate, or at the bottom of the substrate, or within the substrate;
the illumination device is configured to produce coherent incident light beams to form an interference pattern in the inspection area;
the interference pattern comprises a single bright fringe;
the at least one incident beam is contained within an illumination plane, the illumination plane forming an angle between a grazing incidence and a normal incidence, or preferably an angle of between 30 and 80 degrees with a normal of the surface of the support;
the light source is a continuous or a pulsed laser;
the collector comprises a narrow-angle collection channel for collecting the radiation originating from the detection area in a solid angle around a normal z of the support;
the narrow angle collection channel comprises a collection lens;
the collector comprises a wide-angle collection channel for collecting the radiation issued from the detection area in a solid angle away from a normal z of the support;
the wide-angle collection channel comprises at least one collection mirror;
the detector comprises at least one electro-optical transducer, such as a photodiode;
the detector comprises a plurality of electro-optical transducers disposed in a matrix form;
the detector comprises at least one optical fiber optically associated with the at least one electro-optical transducer, a free end of the at least one optical fiber forming the sensing surface;
the system comprises a controller configured to move the support relatively to the illumination device to scan the surface of the substrate with the inspection area;
the detection device is configured such that the detection area is larger along the scanning direction than the inspection area, preferably 1.2 or 1.3 times larger, and more preferably two times or ten times larger;
the detection device is configured such that the detection area contains the inspection area;
the detection area and the inspection area are centered;
the detection area is decentered with respect to the inspection area in the scanning direction;
the detection device is configured such that the detection area is made of distinct detection subareas;
detection device is configured such that the detection area does not entirely contain the inspection area;
the system comprises a processing unit arranged for relating the measurement signal acquired in a detection area (D) to the location of the inspection area (I) at the origin of the measurement signal;
the detection device further comprises an isolation device for isolating the radiation at the at least one first wavelength and the radiation at the at least one second wavelength from each other;
the isolation device comprises at least one spectral filter and/or at least one dichroic beam splitter disposed in the system;
the spectral filter and/or the dichroic beam splitter are based on a wavelength-dependent absorption, reflection or diffraction principle;
the isolation device further comprises at least one focusing lens and/or at least one collimating lens;
the isolation device is positioned between the collector and the sensing surface of the detector;
the isolation device is disposed between the optical fiber and the at least one electro-optical transducer;
the system comprises a narrow-angle collection channel with an isolation device for detecting selectively the radiation at the first wavelength and a wide-angle collection channel with an isolation device for detecting selectively the radiation at the second wavelength.

BRIEF DESCRIPTION OF THE DRAWINGS

Many other features and advantages of embodiments of the present disclosure will become apparent from reading the following detailed description, when considered in conjunction with the accompanying drawings, in which.

DETAILED DESCRIPTION

The present disclosure relates to a system 1 for optical inspection of a substrate 3, for instance, presenting photoluminescence properties. The system may be useful for detecting or characterizing defects, such as crystalline defects and/or particles, or detecting intrinsic photoluminescence of the substrate 3. For simplicity of expression, the term "defect" will be used in the present disclosure for designating the feature of the substrate 3 that provokes scattering or photoluminescence radiation, or a change in the emission of intrinsic photoluminescence whatever the nature of this feature.

The system 1 is particularly adapted for the inspection of substrates presenting photoluminescence properties, such as SiC substrates of any polytype (for instance, 4H SiC or 6H SiC), or compound semiconductor substrates, for instance, comprising GaN, GaAs, or InP. The substrates to be inspected are usually provided as a wafer, i.e., a disk of material of normalized diameter, but the system 1 may be employed for inspecting substrates of any shapes and dimensions. The substrate 3 may be a made of a single material (a bulk substrate) or may be a composite substrate (a superficial thin film of semiconductor material disposed on a support). In the latter case, and in the context of the present disclosure, at least the superficial thin film is presenting photoluminescence properties.

The system 1 comprises an illumination device. On the embodiment represented in FIG. 1, the illumination device comprises a light source S that generates an incident light beam presenting at least one first wavelength. The light source S can be, for instance, a continuous or a pulsed laser. The incident light beam is guided and directed onto an exposed surface of the substrate 3, and the projection of the incident light beam on the exposed surface of the substrate 3 defines an inspection area I. A defect present on, or close to, the surface of the substrate is provoking the emission of scattered and/or of photoluminescent radiation that can be collected and measured, as this will be explained in a later part of this description. The radiation emitted by the surface may therefore present at least the first wavelength (for instance, in the case of elastic scattered light). The radiation may also present at least one second wavelength, different from the at least first wavelength (for instance, in the case of photoluminescence or in the case of any inelastic scattering effect).

The incident light beam is preferably monochromatic, and presents, in the illustrated embodiment, an inspection wavelength short enough so that the energy is greater than the bandgap energy of the material of the substrate 3. The inspection wavelength may lie in the UV, visible or infrared range. For instance, for a SiC 4H bulk substrate 3 (presenting a bandgap of 3.265 eV), the light source S may be selected to generate an incident light beam presenting an inspection wavelength of from 313 nm to 365 nm. Such a material generates photoluminescent radiation at a wavelength close to 380 nm. For an undoped GaAs bulk substrate 3 (presenting a bandgap of 1.42 eV), the inspection wavelength may be selected to be below 500 nm, and the photoluminescent radiation generated by the substrate 3 are present at a wavelength of 873 nm.

Figure 1:
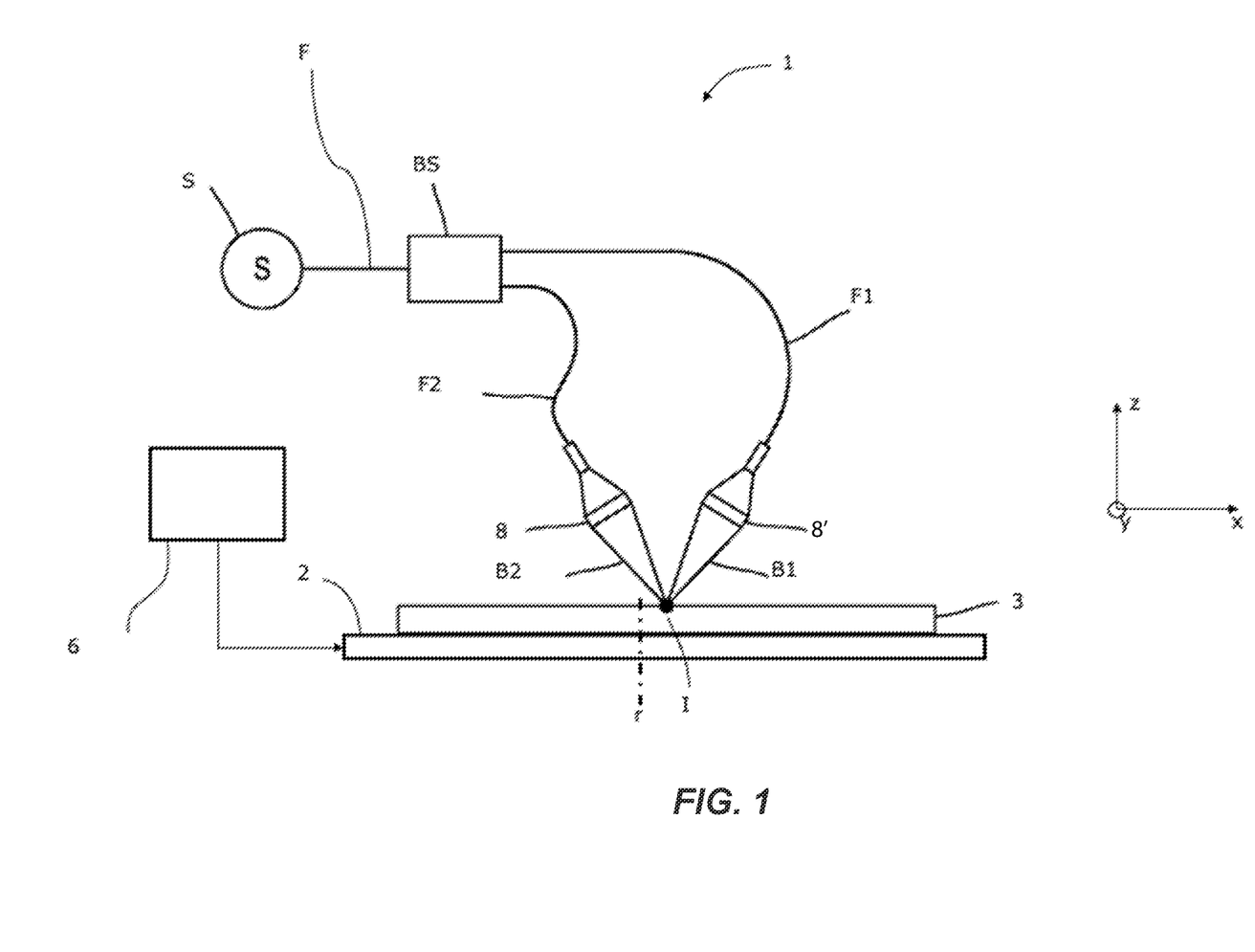
FIG. 1 represents an illumination device of an inspection system according to an embodiment.

In the embodiment represented in FIG. 1, the optical source S is coupled to a beam splitter BS via a first fiber F, the beam splitter BS propagating the light into two separate optical fibers F1, F2. The extremities of the two separate optical fibers F1,F2 are positioned in the inspection system to produce two converging incident light beams B1, B2, the two beams crossing each other to define an inspection volume intercepting the surface of the substrate 3. This particular configuration is facilitated by two converging optical elements 8, 8', such as focusing lenses, respectively disposed in the propagation path of the incident light beams B1, B2. More generally, the light beams may cross each other at the surface of the substrate, or at the bottom of the substrate, or within the substrate.

Figure 3A:
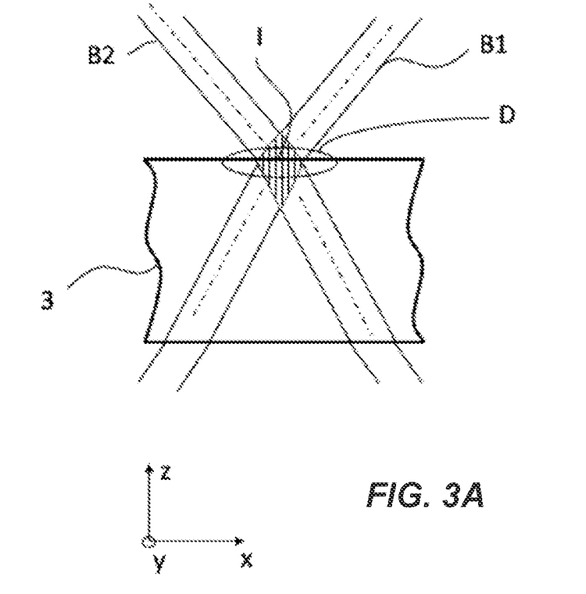
FIG. 3A represents a particular configuration of an illumination device allowing to define an inspection volume intersecting an exposed surface of a substrate.

As this is apparent from FIG. 3A, this embodiment is advantageous in that it allows one to define an inspection volume bounded in the x-y plane and in depth (i.e., z direction) by the intersection of the two incident beams. In the intersection volume, the illumination power is at least twice the illumination power provided by a single beam, thus enhancing the resulting scattering and photoluminescent radiation over radiation arising from elsewhere along the respective beams. In order to optimize that localization, the two incident light beams B1, B2 can be arranged to cross around their focusing position, or waist for Gaussian beams.

In such a configuration, the inspection area I is defined as the intersection of the inspection volume and the surface of the substrate 3. The inspection area I usually presents an elliptical shape. Depending on the angle of incidence of the beams B1, B2 and their focusing conditions, the major axis of the inspection area I may be between 20 μm to 150 μm.

The incident light beams B1, B2 are contained within an illumination plane IP (visible on FIG. 2) forming an angle, with the normal axis z of the surface of the substrate 3, which can be of any value from a grazing incidence (>80 degrees) to a normal incidence (0 degrees). Typically, the illumination plane IP is oriented at an angle with respect to the normal axis z of between 30 and 80 degrees.

In certain embodiments, the illumination device may be configured to produce coherent incident light beams B1,B2 that interfere to form an interference pattern in the inspection area I. In the illustrated embodiment of FIGS. 1 and 3A, the intersecting incident light beams B1,B2 are issued from the same light source S with equal optical paths to the inspection area I. In that configuration, it is possible to produce an interference pattern, for instance, made of parallel fringes modulating the light in a direction defined by the plane of the two incident light beams B1,B2 (the x direction in FIG. 3A). This configuration is particularly advantageous as it improved the spatial selectivity of the illumination. Also, the interference pattern made of parallel fringes provides a modulation frequency in the measurement signal associated to the scattering radiation, which enables improvement of the signal to noise ratio of the inspection system 1. The modulation frequency may also be present in the measurement signal associated with the photoluminescence radiation, if the decay time of that radiation is relatively short (on the order of a nanosecond).

It also can be advantageous to have an interference pattern comprising a single bright fringe. This improves the spatial localization of the inspection area I and thus the spatial resolution of the inspection system 1. It can be achieved by selecting a proper angle between the incident light beams B1,B2 and/or using a light source S with a short coherence length. With an interference pattern consisting of a single bright fringe, the illumination power can be made up to four times greater than the illumination power obtained from one of the incident light beams alone.

The system 1 also comprises a support 2 for positioning the substrate 3 relative to the illumination device. The support 2 and the illumination device are movable relative to each other according to a scanning direction SD of the illumination device with respect to the substrate. As this is well known in the art, the support 2 and/or the illumination device may be associated with actuators configured to move one with respect to the other to achieve this relative movement.

In the embodiment represented in FIG. 1, the support 2 may be rotated around an axis r and may be translated in the (x,y) plane in which the substrate 3 resides. With such a configuration, the relative movement of the substrate 3, disposed on the support 2, may be controlled such that the inspection zone I scans the whole exposed surface of the substrate 3, for instance, in a spiral trajectory.

With continued reference to FIG. 1, the inspection system 1 also comprises a controller 6 for controlling the relative movement of the support 2 with respect to the illumination device to scan the inspection area I over the exposed surface of the substrate, along a desired measurement path. The controller 6 may comprise a microcontroller, data storage, input/output ports connected to the actuators and to other elements of the inspection system 1, and further computing resources that are configured, in hardware or in software, to precisely control the displacement of the inspection area I. The substrate 3 being precisely positioned on the support 2, the controller 6 stores and controls the position (for instance, in linear or polar coordinates) of the inspection area I in a referential linked to the substrate 3. Consequently, the location of the inspection area I on the substrate 3 can be known at each moment.

Figure 2:
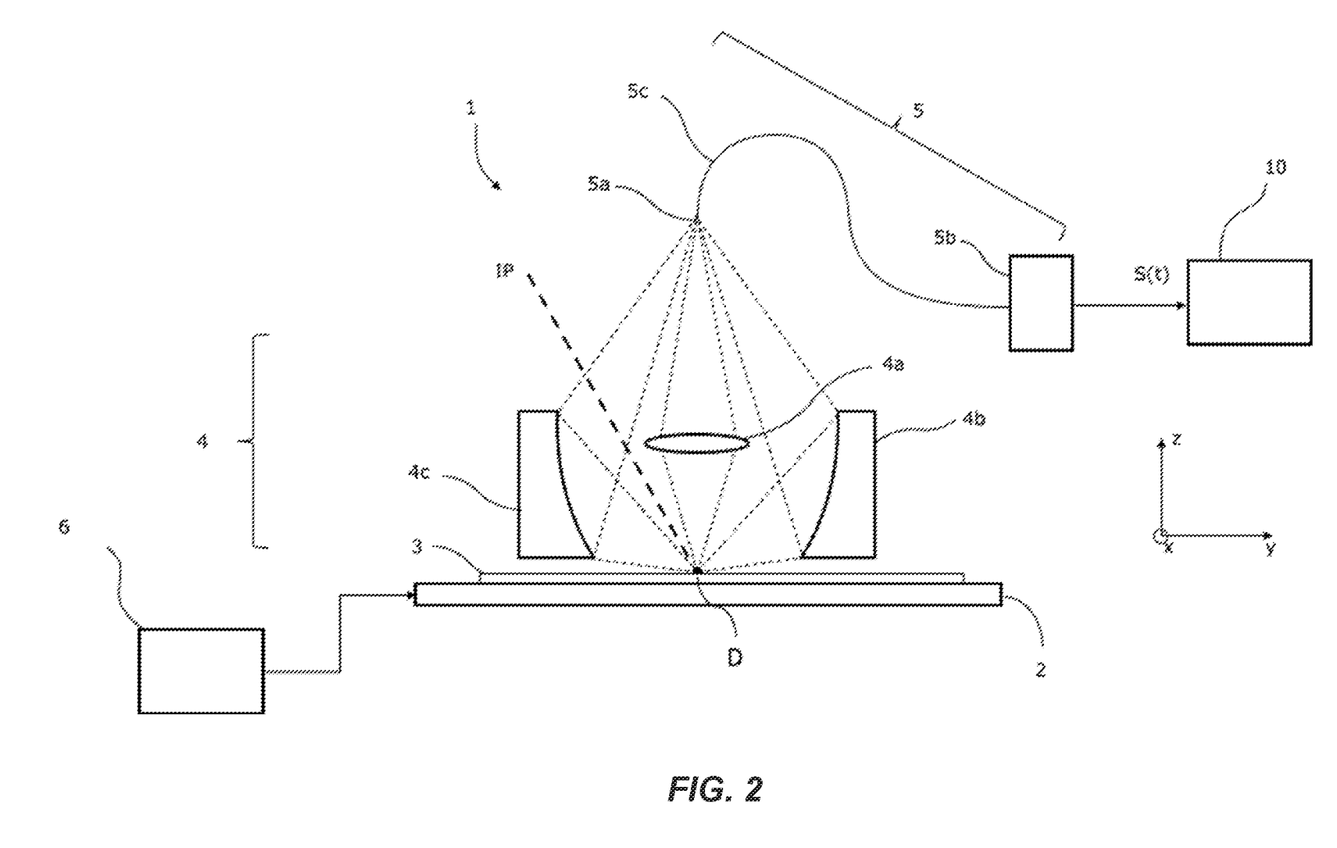
FIG. 2 represents a detection device of an inspection system according to an embodiment.

Referring to FIG. 2, The inspection system 1 also comprises a detection device comprising a collector 4 for collecting at least a portion of the radiation at the first wavelength and/or at the second wavelength originating from a detection area D of the substrate 3. The radiation may be, for instance, generated by a defect lying in the detection area D. The portion of the radiation collected by the collector is designated as "the collected radiation" in the present disclosure. The detection device also comprises a detector 5 optically associated with the collector 4, the detector 5 presents a sensing surface or an entrance pupil 5a for capturing the collected radiation. In the illustrated embodiment, the detection area D corresponds to the optical conjugate or the projection, by the collector 4, of the sensing surface 5a. More generally, the detection area D may be defined as the area of the substrate that encompasses all the emitted radiation that is collected by the collector 4 and the sensing surface or the entrance pupil 5a. The detector 5 provides a measurement signal S(t) representing the variation in intensity of the collected radiation as the illumination device is moved along the scanning direction SD with respect to the substrate 3.

In the embodiment represented in FIG. 2, the collector 4 comprises a narrow-angle collection channel for collecting the radiation originating from the detection area D in a solid angle around the normal axis z of the support 2. The solid angle may typically extend between 0 and 10 degrees around the normal axis z. The narrow-angle collection channel is configured to direct the collected radiation to the sensing surface 5a of the detector 5. The narrow angle collection channel may comprise a collection lens 4a disposed in the system 1, as is illustrated in the embodiment of FIG. 2. The collection lens 4a of this embodiment is centered about an axis passing through the detection area D and perpendicular to the substrate 3.

The collector 4 also comprises a wide-angle collection channel for collecting the radiation issued from the detection area D in a solid angle away from a normal z of the support 2. This solid angle may typically extend from 60 to 89 degrees around the normal axis z. The wide-angle collection channel is also configured to direct the collected radiation to the sensing surface 5a of the detector 5. The wide collection channel may comprise at least one collection minor 4b, 4c disposed in the system 1. As illustrated in the embodiment of FIG. 2, the wide-angle collection channel may be further split into two channels, a forward collection channel in the direction of the forward scattering of the light, and a backward collection channel in the direction of the backward scattering. Each of the forward and backward collection channel is provided with its respective collection mirror 4b, 4c.

In some embodiments, the inspection system can be based on a dark field configuration, ensuring that the specular reflections of the incident light beam(s) B1,B2 on the substrate 3 are not collected by the collector 4, and, in particular, not collected by the narrow-angle collection channel nor by the wide-angle collection channel.

In certain embodiments, the detector 5 may comprise at least one electro-optical transducer 5b, such as a photodiode or an array of photodiodes. The electro-optical transducer 5b may constitute the sensing surface 5a of the detector 5, and in such a case it is positioned in the system 1 in the focus zone of the collector 4. Preferably however, the electro-optical transducer 5b is removed from the sensing surface 5a, and the collected radiation is guided from the focus zone of the collector to the electro-optical transducer 5b, for instance, by an optical fiber 5c or a bundle of optical fibers 5c (generally designated as "collecting fiber" in the following part of this description) extending between the sensing surface 5a and the electro-optical transducer 5b. In such a configuration, the free end of the collecting fiber 5c is positioned in the focus zone of the collector 4 and the core(s) of the fiber(s), at the free end, forms the sensing surface 5a of the detector 5.

Instead of a photodiode or of an array of photodiodes, the electro-optical transducer 5b may comprise a photomultiplier, an avalanche photodiode, an image sensor, such as a so-called CMOS image sensor or CCD image sensor. The image sensor may also present time delay integration features. The detector 5 may also comprise a spectrometer, to analyze the optical spectrum of the collected radiation, in particular, of the photoluminescent radiation (i.e., presenting at least the second wavelength).

In the inspection system 1 of the present disclosure, the detection area D can be adjusted in size and position independently from the inspection area I. As mentioned above, the detection area D is the optical conjugate or the projection, by the respective collection channels of the collector 4, of the entrance pupils of the detector 5, i.e., the sensing surface 5a of the detector 5. So, by positioning the sensing surface 5a differently or adjusting its size or by adapting the magnification of the collector 4, the detection area D can be positioned or sized differently relative to the substrate 3 and the inspection area I.

For example, a fiber bundle with several fibers disposed according to a certain pattern (in line, in circle, . . . ) may be used. Each fiber can form an entrance pupil 5a of a specific detector and be conjugated to a possibly distinct detection area D by a specific channel of the collector 4 (narrow-angle, wide angle, front, back . . . ). Then the location of the sensing surface 5a with respect to the collector 4 defines the location of the detection area D.

According to an important feature, the inspection system 1 is configured such that the inspection area I and the detection area D do not perfectly correspond to each other. More precisely, the inspection area I is positioned ahead of, or prior to, at least a portion of the detection area D with respect to the scanning direction SD, while the inspection zone I scans the exposed surface of the substrate 3. Said differently, the controller 6 is configured to control the relative movement of the support 2 with respect to the illumination device, such that, along the measurement path imposed by the controller 6, the inspection area I is positioned ahead of at least a portion of the detection area D with respect to the scanning direction SD (FIGS. 3B-3E).

This means that a part of the substrate 3 having left the inspection area I due to this displacement will still be in the detection area D for some time. As a consequence, the residence time of a defect in the detection area D is greater than, and/or delayed with respect to, the residence time of the defect in the inspection area I as the substrate 3 is moved under the illumination beam. The measurement time of the photoluminescent radiation emitted by a defect is increased and this allows, for instance, collection of the radiation emitted during the establishment of photoluminescence and associated decay times. Consequently, the velocity at which the illumination beam is scanned over the exposed surface of the substrate 3 may be increased without loss of collection of the photoluminescence signal, and the inspection system 1 throughput is improved.

A possible configuration for implementing this feature to efficiently collect the photoluminescent radiation is to configure the inspection system 1 such that the detection area D is larger than the inspection area I (along the scanning direction). Preferably, the detection area D is at least 1.2 or 1.3 times larger, preferably at least two times larger, or even up to 10 times larger, along the scanning direction than the inspection area I. For properly collecting the scattering radiation, the inspection system 1 is configured such that the detection area D covers at least in part the inspection area I. For instance, with a detection area D with a length of 100 µm to 200 µm, and a significant part of the detection area D (such as 50%-100%) lagging behind the inspection area I along the scanning direction SD, and a substrate 3 spinning at several thousand rotations per minute, integration times of the photoluminescent radiation of a few microseconds are easily achieved.

It should be noted that, when the defect density in or on the substrate 3 is low enough that defects appear one at a time in the detection area D, the spatial resolution of the inspection system 1 is defined rather by the size of the inspection area I, which can be, for instance, in the range of 20 µm to 150 µm, even when the detection area D is enlarged. So, the increase in throughput is achieved without decreased spatial resolution.

The measurement signal S(t) issued from the detector 5 and representing the variation in intensity of the collected radiation is provided to a processing unit 10. The processing unit comprises a computer or a microcontroller, with data storage and interface ports. The processing unit 10 is also connected to the controller 6, which provides the location of the inspection area I and/or of the detection area on the wafer at any time. The processing unit is configured to provide a signal map representing the measurement signal S(t) as a function of the location in the referential linked to the substrate 3. Preferably, as the detection area D and the inspection area I do not coincide in position (i.e., are not centered), the processing unit is further configured to provide a signal map taking into account any offset between the inspection area I center and the detection area D center.

FIGS. 3B to 3E represent various possible configurations according to which the inspection area I is positioned ahead of at least a portion of the detection area D, with respect to the scanning direction SD. In these figures, and for the sake of clarity, the scanning direction SD represents the relative movement of the illumination device with respect to the substrate 3. In the represented embodiment where the support 2 is moved while the illumination device is maintained fixed, the movement of the substrate is opposite to the scanning direction SD. As previously explained with reference to FIG. 2, the various detection areas D can be defined and positioned as an optical conjugate of a distinct optical fiber of a fiber bundle.

Figure 3B:
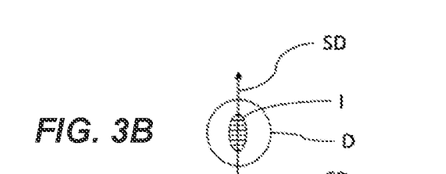
FIGS. 3B to 3E represent various possible configurations according to which an inspection area of the inspection system is positioned ahead, with respect of the scanning direction, of at least a portion of a detection area.

FIG. 3B illustrates a first configuration in which the inspection area I and the detection area D are centered, the inspection area I having a smaller dimension than the detection area D, and therefore being contained in this area.

Figure 3C:
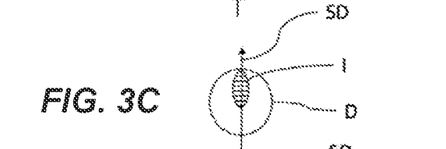

In the configuration of FIG. 3C, the detection area D covers the inspection area I, but is decentered in the scanning direction so that a point of the substrate generating photoluminescent radiation will stay longer in the field of view of the detector 5 when compared to the concentric configuration of FIG. 3B.

Figure 3D:
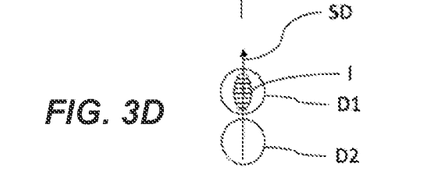

FIG. 3D illustrates another configuration in which the detection area D is made of distinct detection subareas D1, D2.

This configuration can be achieved by using, for instance, a collection fiber 5c made of several optical fibers of a bundle to collect radiation at different positions with respect to the inspection area I. In the example illustrated, a first detection subarea D1 covers the inspection area I to collect the scattering and photoluminescent radiation. A further detection subarea D2, trailing behind the inspection area I in the scanning direction SD, is provided to only collect the photoluminescent radiation with a time delay. Such multizone detection may allow to estimate a fluorescence lifetime, for instance, which may be useful for defect classification.

Figure 3E:
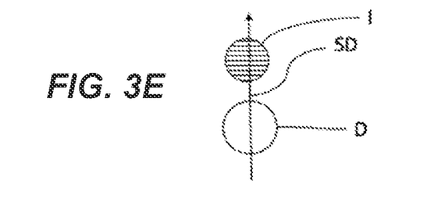

FIG. 3E illustrates a further configuration in which the inspection area I is not contained in the detection area D, but positioned ahead of the detection area D in the scanning direction SD. In this configuration, the scattering radiation is not collected and only the delayed portions of the photoluminescent radiation is collected.

The inspection system 1 of the present disclosure allows collecting both the scattering and photoluminescent radiation emitted by a defect of the inspected substrate. In some applications, it may be beneficial to isolate, in separate measurement signals, the contribution of each type of radiation or even to filter out one type of radiation.

In some instances, the photoluminescent radiation, in particular, when this radiation is intrinsic to the material of the substrate 3, may be considered as an unwanted source of noise when performing scattering or dark field measurements for particle, defect, "haze" or surface roughness characterization of the substrate 3. This is, for example, the case when inspecting substrate made of a compound material such as GaAs, InP or SiC. In that application, it would be beneficial to equip the inspection system 1, at least for some of the collection channels, with high pass (in frequency) or bandpass filters letting pass only the radiation at the inspection wavelength (to collect the scattering radiation) and cutting out all radiation at longer wavelengths (to filter out photoluminescent radiation).

In other applications, it would be beneficial to let pass only the photoluminescent radiation and to block all radiation at the inspection wavelength. This is the case for characterizing substrates comprising light emitting active layers, for LED, μLED and VCSELs devices. Analysis of the collected radiation wavelengths, FWHM, and intensity, which that can be performed in the inspection system 1 (e.g., in the processing unit 10), or using a computer system separate from the inspection system 1, may help in better characterizing the light emitting active layers.

In other applications, both the scattering radiation and the photoluminescent radiation may be exploited for inspecting the substrate. For instance, it is well known that the characterization of the various defects, such as basal plane dislocations (BPD), carrots, TED, or micropipes that may be present in the thickness of an epitaxial SiC layer can be performed efficiently by combining scattering measurements and photoluminescent measurements. In that case, it would be beneficial to equip the inspection system 1 with filters in the narrow angle collection channel retaining only the photoluminescent radiation in the visible and/or NIR, or only the scattering radiation, while the wide-angle collection channel is devoted to detection of scattering radiation, or photoluminescent radiation. This allows the use of the same number of detectors.

The isolation or the filtering out of certain radiation types may be obtained by certain configurations of the inspection and detection areas I,D, as has been described with reference to FIG. 3E, for example. In other embodiments, the inspection system 1 may be provided with at least one isolation device 7 (FIGS. 4A-4C) for isolating the photoluminescent radiation and the scattering radiation from each other or for filtering out one of them. This is made possible by the fact that, generally speaking, the photoluminescence radiation and the scattering radiation exhibit different wavelengths.

Figure 4A:
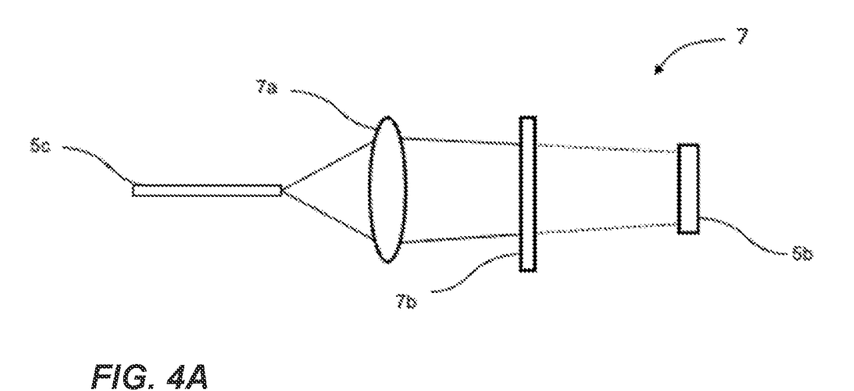
FIG. 4A to 4C represent various embodiments of an isolation device of the inspection system.
Figure 4B:
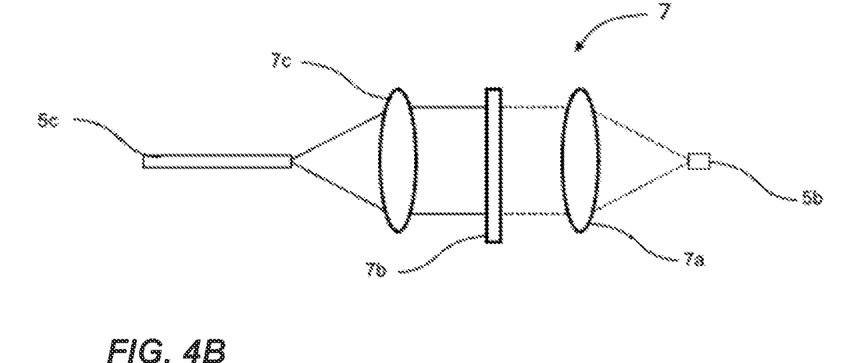

Referring to FIGS. 4A and 4B, an isolation device 7 may comprise at least one spectral filter 7b and/or at least one dichroic beam splitter 7d disposed appropriately in the system for filtering one of the two types of radiation or for separating the two types of radiation.

For instance, the isolation device 7 may be placed, in the inspection system 1 shown in FIG. 2, in-between the electro-optical transducer 5b, and the collecting fiber 5c. In that configuration, the collecting fiber 5c conveys all the collected scattering and photoluminescent radiation. That configuration has the advantage of being very simple and versatile, as the spectral selection is outside of the collection channels, in a remote unit.

FIGS. 4A and 4B illustrate different embodiments of the isolation device 7. In each of these embodiments, the spectral filter 7b can be either:
 a band pass or high pass filter (in frequency) letting pass the inspection wavelength and rejecting longer photoluminescence wavelengths, to detect scattering radiation without being affected by photoluminescence radiation; or
 a band pass or low pass filter (in frequency) letting pass the photoluminescence wavelength(s) in at least a spectral region (near UV/Visible, NIR) and rejecting the inspection wavelength(s), to detect photoluminescence radiation without being affected by scattering radiation.

In the embodiments of FIG. 4A, the spectral filter 7b is simply positioned between a focusing lens 7a focusing the light issued from the optical fiber 5c onto the filter 7b and the electro-optical transducer 5b.

It is usually preferable to position the filter 7b in a collimated beam, to avoid introducing optical aberrations, and to place the filter 7b in an optimal condition from the standpoint of its spectral selectivity. This is illustrated in the embodiment of FIG. 4b, where the filter 7b is positioned in a collimated beam between a focusing lens 7a and a collimating lens 7c, the two lenses forming an optical relay.

In the embodiments of the isolation device 7 represented in FIGS. 4A and 4B, the filters 7b may of course be changeable by mounting them, for instance, on a filter wheel.

Figure 4C:
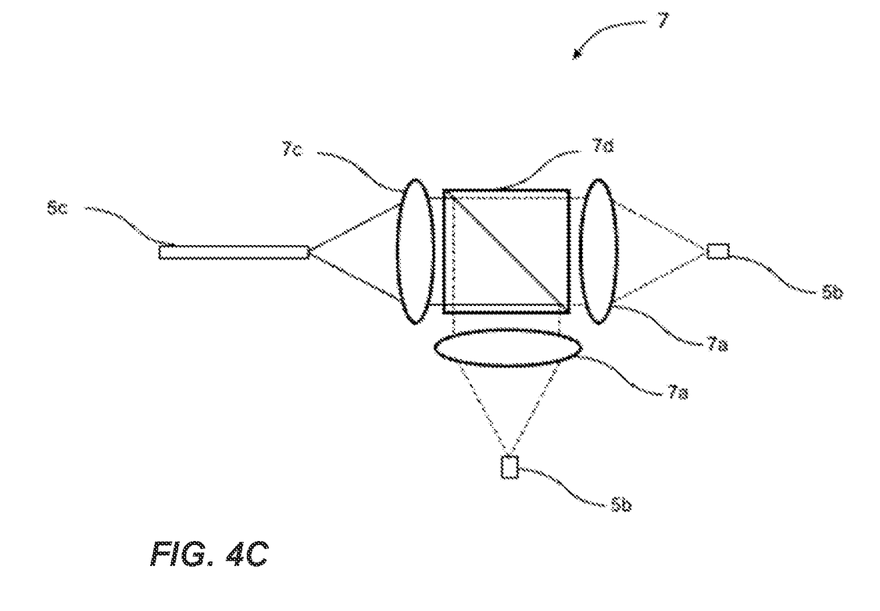

FIG. 4C illustrates a further embodiment of the isolation device 7, this time including a dichroic beam splitter 7d, which separates the radiation issued from the collecting fiber 5c between two detection channels. According to the preferred embodiment presented on FIG. 4C, the dichroic beam splitter 7d is positioned between the collimation and focusing lenses 7a, 7c of an optical relay, in a collimated beam.

The dichroic beam splitter 7d can be configured, for instance, to:
 direct the scattering radiation at the inspection wavelength (for instance, UV radiation) to one electro-optical transducer 5b and the photoluminescent radiation (for instance, visible or NIR radiation) to another electro-optical transducer 5b; and/or
 direct the photoluminescent radiation lying in a spectral range (for instance, visible or NIR) to one electro-optical transducer 5b and the photoluminescent radiation in another spectral range (for instance, visible or NIR) to another electro-optical transducer 5b.

In another embodiment, the spectral filter 7b or the dichroic beam splitter 7d of the isolation device 7 may be positioned at the level of the collection channels.

Figure 5:
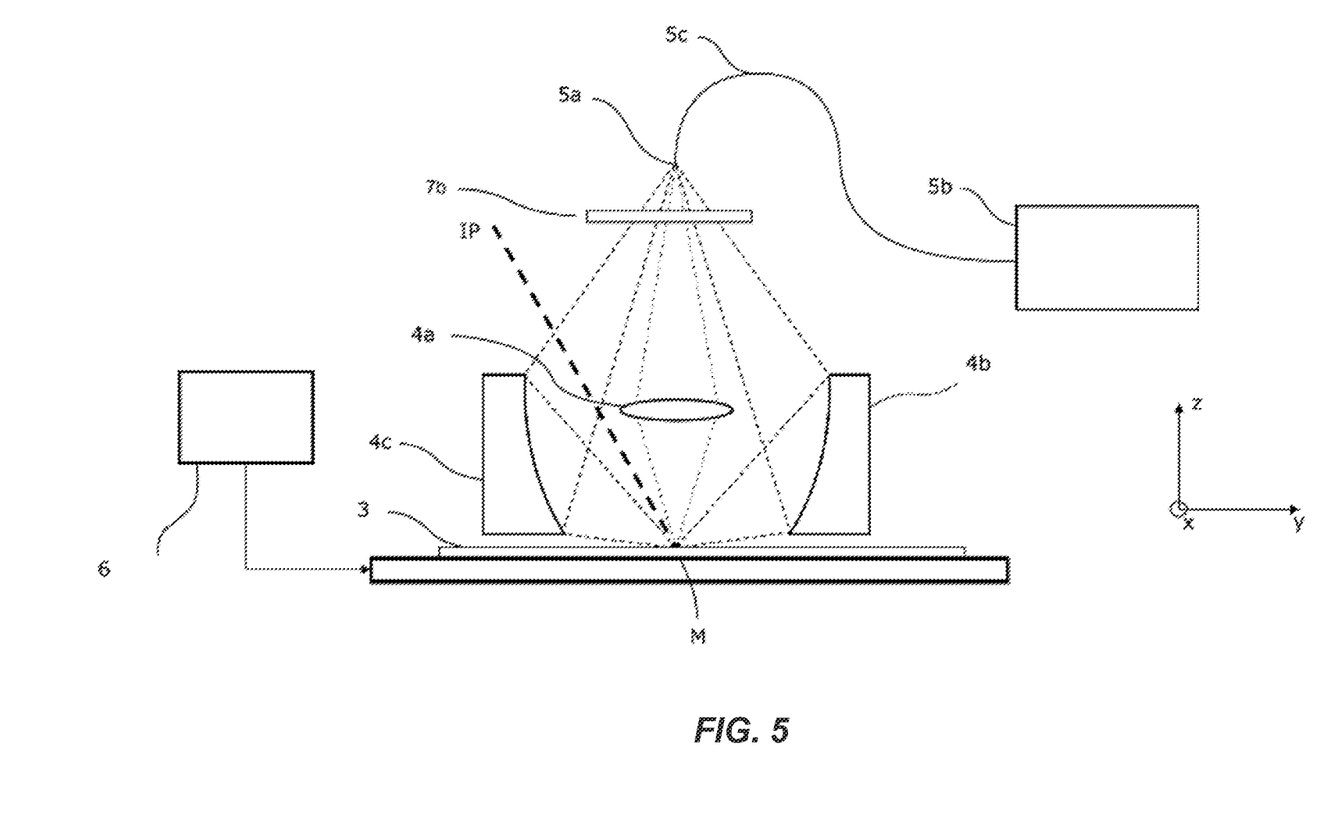
FIGS. 5 to 10 represent various embodiments of an inspection system provided with an isolation device.

In FIG. 5, a spectral filter 7b is positioned between the collector 4 and the and the sensing surface or the entrance pupil 5a of the detector 5. A single filter 7b can be used for each of the collection channels of the collectors, as illustrated, or several distinct filters 7b can be used for distinct channels.

Figure 6:
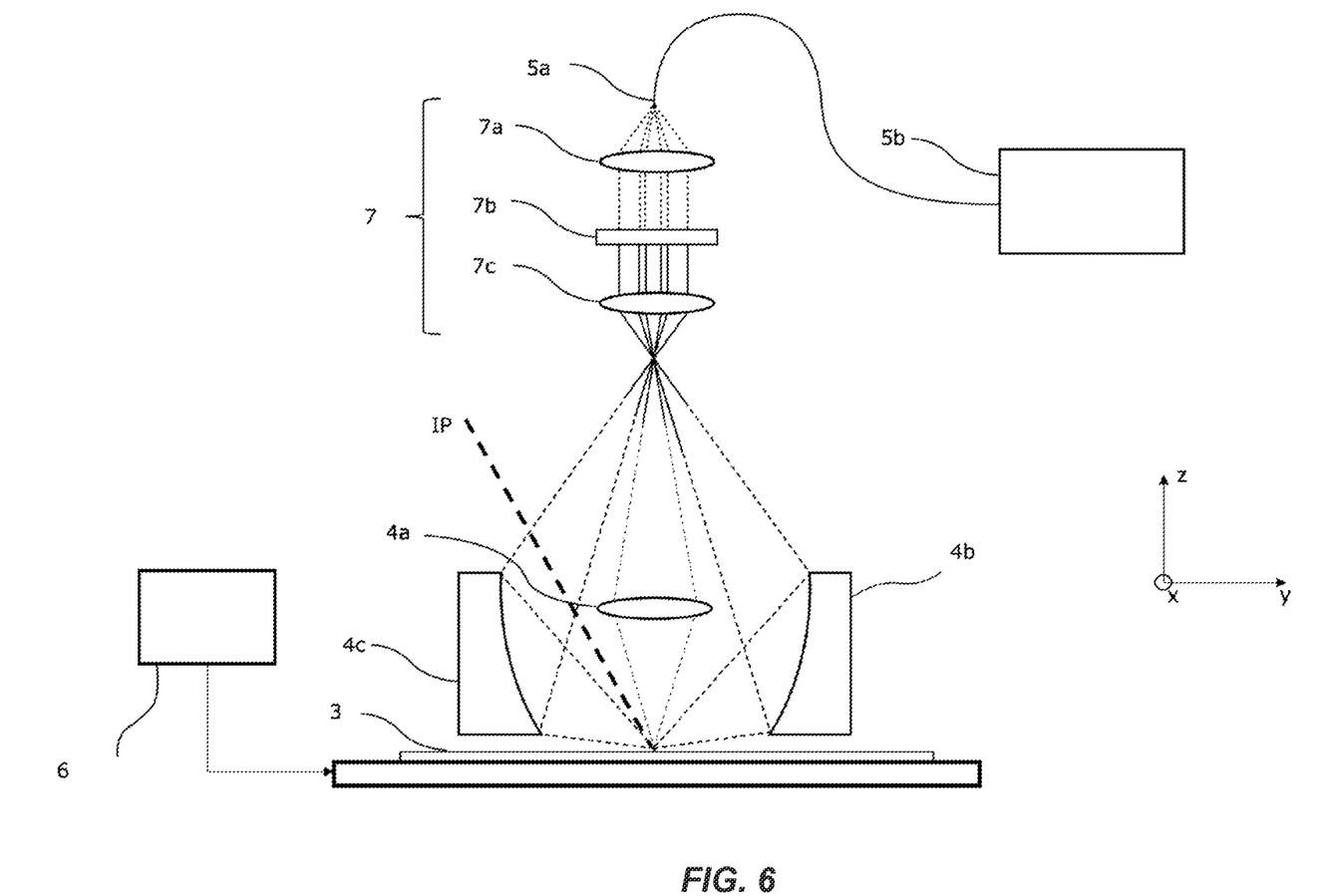

FIG. 6 illustrates another embodiment that differs from the one of FIG. 5 in that the spectral filter 7b is placed, in an optical relay configuration, in front of the sensing surface 5a of the detector 5. As previously explained, the optical relay configuration presents the advantage of positioning the filter in a collimated part of the beam formed of the collected radiation.

Figure 7:
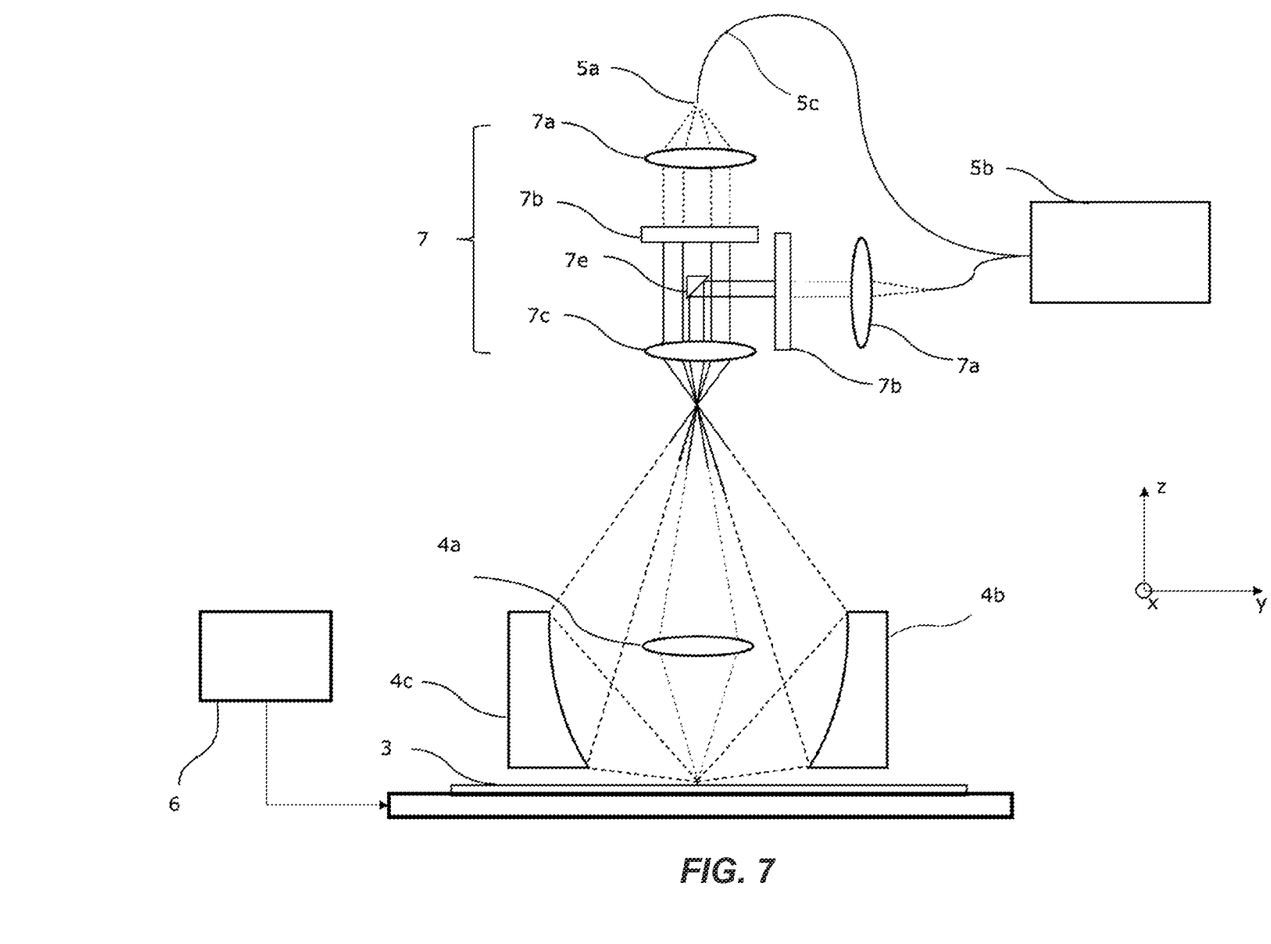

FIG. 7 illustrates another embodiment, that differs from the one of FIG. 6 in that the collimated beam of the narrow-angle collection channel of the collector 4 is deflected by a turning prism 7e. A mirror with a central hole can serve the same function. That embodiment allows implementing different spectral filters for the different detection channels more easily.

Figure 8:
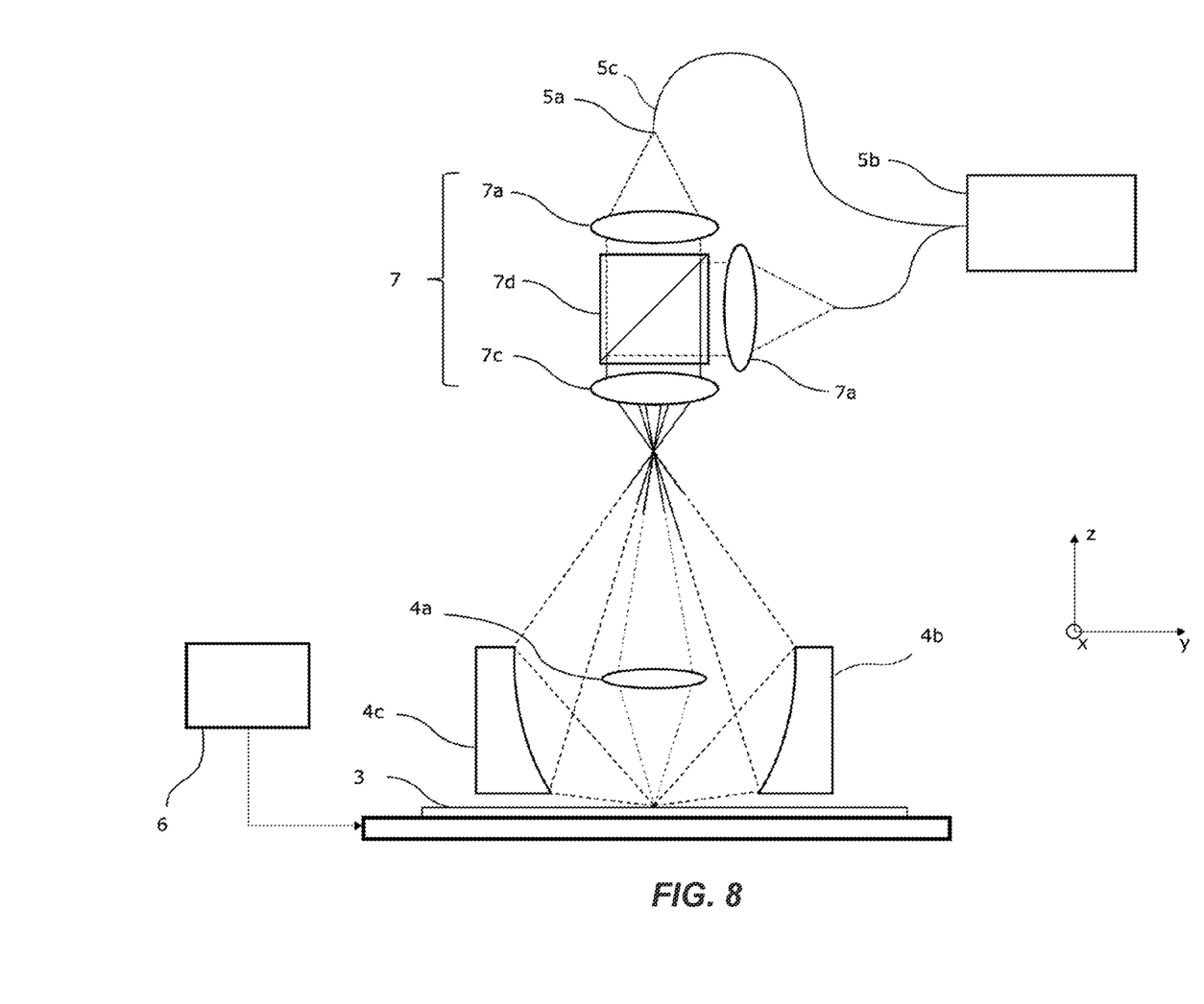

FIG. 8 illustrates another embodiment, which differs from the one of FIG. 7 in that the spectral filters 7b and the turning prism 7e are replaced by a dichroic beam splitter 7d separating the radiation collected from the narrow-angle collection channel and from the wide-angle collection channel.

Figure 9:
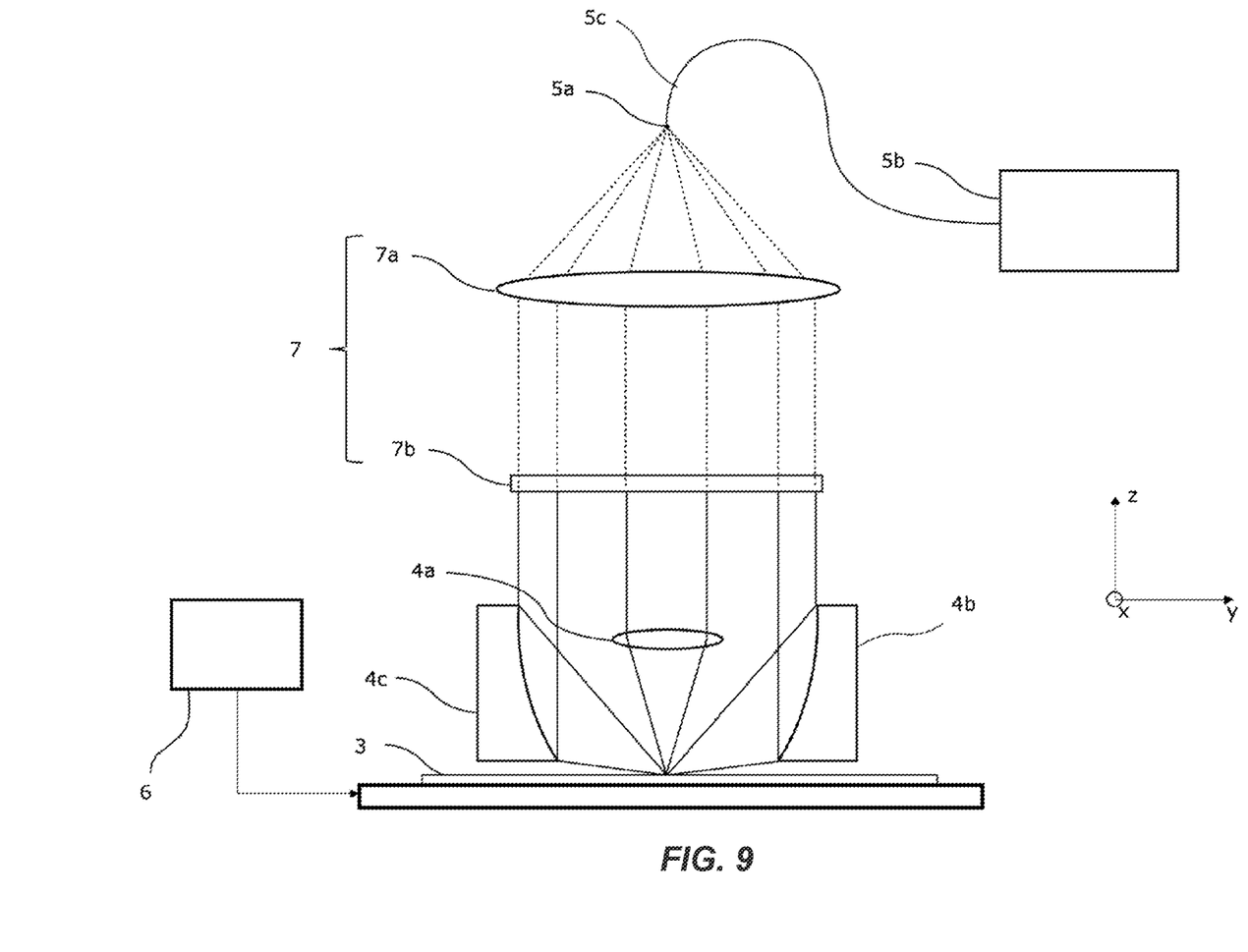

FIG. 9 illustrates another embodiment, which differs from the one of FIG. 6 in that the collection channels of the collector 4 are configured to provide parallel collimated beams, which are focused on the sensing surface 5a of the detector 5, here the core of the collecting fiber 5c, by a focusing lens 7a. The dichroic filters 7b can then be positioned in the collimated part of the beams.

Figure 10:
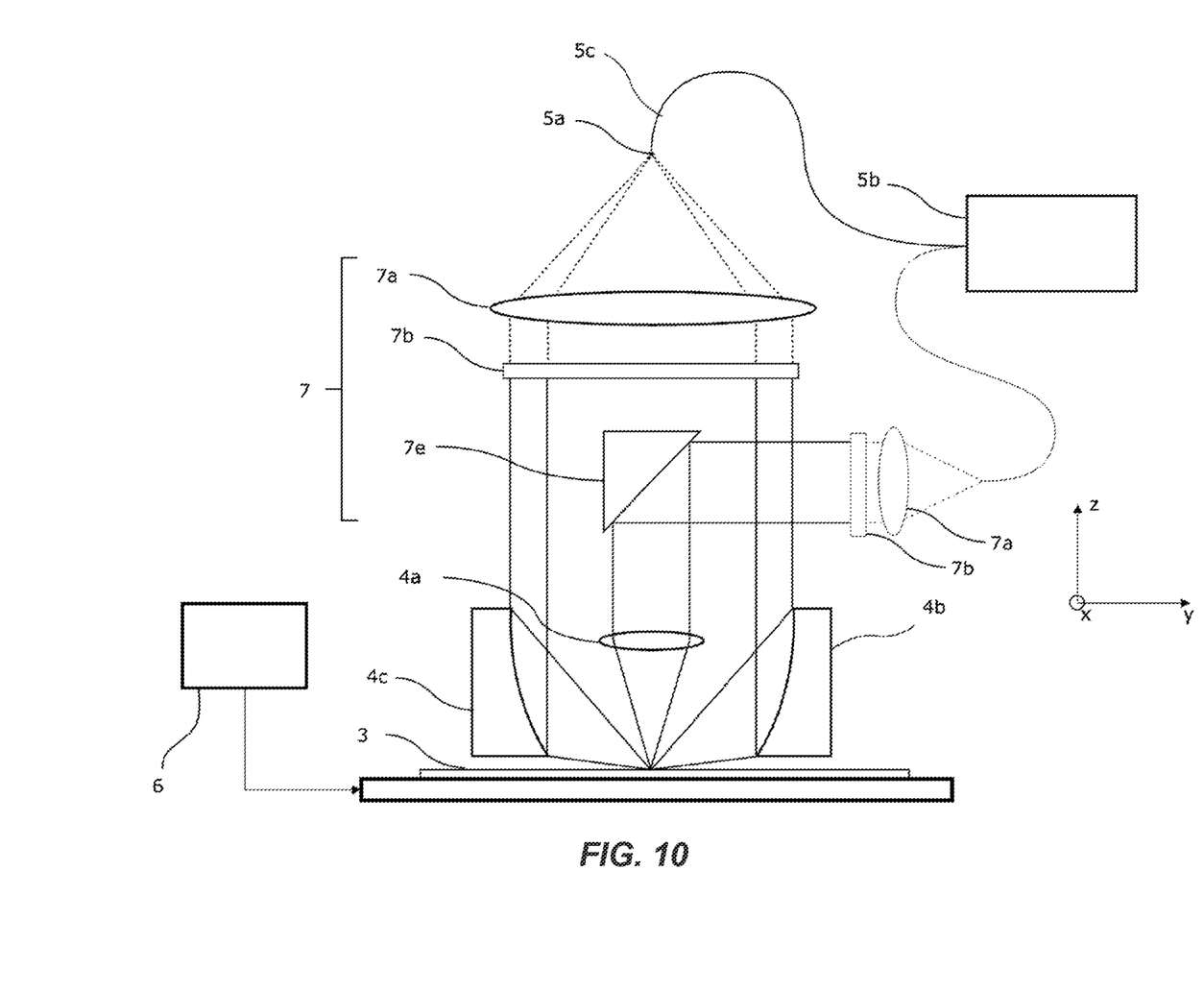

FIG. 10 illustrates another embodiment in which the collection channels are configured to provide the collected radiation as parallel collimated beams as in FIG. 9, and which comprises a turning prism 7e for the narrow-angle collection channel as in FIG. 6.

It has been observed that defects (such as pits or triangle-shaped defects) present at the surface of the substrate 3 scatter light mostly at narrow angles. Defects present in the thickness of the substrate 3 (for instance, defects present in the thickness of a superficial epitaxial layer) radiate photoluminescence radiation in a broad range of solid angles. So, the embodiment of FIGS. 7, 8 and 10 are particularly advantageous in that respect. By selectively filtering the radiation collected in each of the narrow-angle and wide-angle collection channels, it is possible to discriminate between surface defects and subsurface defects. For example, it can be advantageous to retain only the scattering signal in the narrow-angle collection channel, and only the photoluminescence signal in the wide-angle collection channel. In that case, the system 1 of, for instance, FIG. 7, FIG. 8 or FIG. 10 comprises a narrow-angle collection channel provided with an isolation device 7 for selectively detecting the scattered radiation and a wide-angle collection channel provided with an isolation device 7 for selectively detecting the photoluminescence radiation.

The above-mentioned embodiments have been described in configurations allowing management of elastic scattering radiation at a first excitation wavelength, and radiation issued from photoluminescence effects at one or more second wavelengths different from the first wavelength.

Of course, these embodiments can be configured with isolation devices 7 arranged to manage radiation at various wavelengths due to other physical effects. For instance, they can be used to manage and discriminate between radiation issued from elastic scattering at one or more first wavelengths and inelastic scattering at one or more second wavelengths. They can also be used to manage and discriminate between radiation issued from inelastic scattering and photoluminescence, respectively.

Other variations to the disclosed embodiments can be understood and effected by those skilled in the art in practicing the claimed disclosure, from a study of the drawings, the disclosure, and the appended claims.

What is claimed is:

1. A system for optical inspection of a substrate, the system comprising:
   an illumination device comprising a light source for generating at least one incident light beam exhibiting at least a first wavelength directed onto an exposed surface of the substrate and defining an inspection area of the substrate, defects present on, or close to, the surface of the substrate provoking an emission of radiation at the first wavelength and/or radiation exhibiting at least a second wavelength different from the at least first wavelength;
   a support to receive the substrate and to position the substrate relative to the illumination device, the support and the light source being movable relative to each other according to a scanning direction; and
   a detection device comprising a collector for collecting at least a portion of the radiation at the first wavelength and/or at the at least a second wavelength originating from a detection area of the substrate, and a detector optically associated with the collector, the detector including a sensing surface for capturing the collected radiation, the detection area being the area of the substrate that encompasses all the emitted radiation collected by the collector and captured by the sensing surface of the detector at a given point in time, the detection device providing a measurement signal representing a variation in intensity of the collected radiation as the substrate is moved along the scanning direction;
   wherein the system is in a dark field configuration ensuring that the specular reflections of the incident light beam on the substrate are not collected by the collector and is configured to position the inspection area ahead of at least a portion of the detection area, with respect to the scanning direction, while the inspection area scans the exposed surface of the substrate, such that a part of the substrate having left the inspection area due to a relative movement of the support and the light source will remain in the detection area for a period of time.

2. The system of claim 1, wherein the illumination device comprises a splitter configured to form two incident light beams converging and crossing each other on the substrate to define the inspection area.

3. The system of claim 2, wherein the illumination device is configured to produce coherent incident light beams to form an interference pattern in the inspection area.

4. The system of claim 3, wherein the interference pattern comprises a single bright fringe.

5. The system of claim 1, wherein the collector comprises a narrow-angle collection channel for collecting radiation originating from the detection area in a solid angle around a normal axis of the support and/or a wide-angle collection channel for collecting radiation originating from the detection area in a solid angle away from the normal axis of the support.

6. The system of claim 1, wherein the detector comprises at least one electro-optical transducer.

7. The system of claim 6, wherein the at least one electro-optical transducer comprises at least one photodiode.

8. The system of claim 6, wherein the detector comprises at least one optical fiber optically associated with the at least one electro-optical transducer, a free end of the at least one optical fiber forming the sensing surface.

9. The system of claim 1, wherein the detection device is configured such that the detection area is larger along the scanning direction than the inspection area.

10. The system of claim 9, wherein the detection device is configured such that the detection area is at least 1.2 times larger than the inspection area.

11. The system of claim 10, wherein the detection device is configured such that the detection area is at least two times larger than the inspection area.

12. The system of claim 11, wherein the detection device is configured such that the detection area is at least ten times larger than the inspection area.

13. The system of claim 1, wherein the detection device is configured such that the detection area contains the inspection area.

14. The system of claim 13, wherein the detection area is decentered with respect to the inspection area in the scanning direction.

15. The system of claim 1, wherein the detection device is configured such that the detection area includes distinct detection subareas.

16. The system of claim 1, further comprising a processing unit configured to relate the measurement signal acquired in a detection area to the location of the inspection area at the origin of the measurement signal.

17. The system of claim 1, wherein the detection device further comprises an isolation device for isolating the radiation at the first wavelength and the radiation at the at least a second wavelength from each other.

18. The system of claim 17, wherein the isolation device is positioned between the collector and the sensing surface of the detector.

19. The system of claim 17, wherein the detector comprises at least one optical fiber optically associated with at least one electro-optical transducer, a free end of the at least one optical fiber forming the sensing surface, and the isolation device is disposed between the optical fiber and the at least one electro-optical transducer.

20. The system of claim 1, further comprising a narrow-angle collection channel with an isolation device for detecting selectively the radiation at the first wavelength and a wide-angle collection channel with an isolation device for detecting selectively the radiation at the at least a second wavelength.

\* \* \* \* \*